United States Patent
Babagbeto et al.

(10) Patent No.: US 8,150,999 B2
(45) Date of Patent: Apr. 3, 2012

(54) MESSAGING SERVICE IN A PEER TO PEER TYPE TELECOMMUNICATIONS NETWORK

(75) Inventors: Patrick Babagbeto, Trebeurden (FR); Didier Neveux, Cavan (FR); Eric Debeau, Lannion (FR)

(73) Assignee: France Telecom, Paris (FR)

( * ) Notice: Subject to any disclaimer, the term of this patent is extended or adjusted under 35 U.S.C. 154(b) by 868 days.

(21) Appl. No.: 11/667,288

(22) PCT Filed: Nov. 3, 2005

(86) PCT No.: PCT/FR2005/050924
§ 371 (c)(1),
(2), (4) Date: Nov. 23, 2007

(87) PCT Pub. No.: WO2006/051232
PCT Pub. Date: May 18, 2006

(65) Prior Publication Data
US 2008/0101558 A1    May 1, 2008

(30) Foreign Application Priority Data
Nov. 8, 2004 (FR) ..................... 04 11860

(51) Int. Cl.
*G06F 15/173* (2006.01)
*G06F 15/16* (2006.01)
(52) U.S. Cl. ....................... 709/238; 709/206
(58) Field of Classification Search .......... 709/201–207, 709/238–245
See application file for complete search history.

(56) References Cited

U.S. PATENT DOCUMENTS

| 7,657,253 | B2* | 2/2010 | Lewis ................... 455/412.2 |
| 7,685,301 | B2* | 3/2010 | Mai ....................... 709/230 |
| 2003/0154238 | A1* | 8/2003 | Murphy et al. ........... 709/201 |
| 2004/0044774 | A1* | 3/2004 | Mangalik et al. ........ 709/227 |
| 2004/0064512 | A1 | 4/2004 | Arora et al. |
| 2004/0064568 | A1* | 4/2004 | Arora et al. ............. 709/228 |
| 2004/0230659 | A1* | 11/2004 | Chase ................... 709/206 |
| 2005/0076098 | A1* | 4/2005 | Matsubara et al. ....... 709/219 |
| 2006/0002520 | A1* | 1/2006 | Bettis et al. ........... 379/88.17 |
| 2006/0068766 | A1* | 3/2006 | Xu et al. ............... 455/414.1 |

FOREIGN PATENT DOCUMENTS

| EP | 0 760 573 A | 3/1997 |
| FR | 2 838 011 A | 10/2003 |

OTHER PUBLICATIONS

J. Reynier, "Projet: ce que vous devez savoir avant de fabriquer un réseau de partage Peer to Peer", p. 4, line 7-41, Jun. 7, 2004 http://ww.di.ens.fr/{jreynier/Recherche/Projet%20P2P.pdf.

* cited by examiner

*Primary Examiner* — Yasin Barqadle
(74) *Attorney, Agent, or Firm* — Cozen O'Connor

(57) ABSTRACT

This messaging system is for use in a peer to peer network including at least one depositary peer (PX, PR) adapted to store a message in one or more portions and to send a message notifying the completion of the storage of that portion to at least one superpeer (SPX) of the peer (PX) of the depositor (X) of the message (M). This superpeer (SPX) is adapted to send a notice of reception of the message to a peer (PY) of the addressee (Y) of that message, that notice including a list of the depositary peers (PX, PR) and an identifier of each of the portions of said message stored by each of the depositaries (PX, PR).

10 Claims, 2 Drawing Sheets

MESSAGING SERVICE IN A PEER TO PEER TYPE TELECOMMUNICATIONS NETWORK

RELATED APPLICATIONS

This is a U.S. National Stage of International Application No. PCT/FR2005/050924, filed on Nov. 3, 2005.

FIELD OF THE INVENTION

The present invention relates to a messaging service in a "peer to peer" type telecommunications network.

More precisely, this service enables a depositor connected to the peer to peer network to deposit a message for an addressee also able to connect to that network.

The invention can be used for voice or videophone messages in particular.

BACKGROUND OF THE INVENTION

More generally, a message can consist of any electronic file.

With voice or videophone messages, there exist at present two principal solutions for depositing a message for an addressee if the addressee's terminal is busy or does not answer.

Firstly there are standard videophone answering machines connected to the addressee's terminal.

The major drawback of that first solution stems from the fact that the user of the service needs to acquire hardware (an answering machine) to receive messages.

That solution cannot take the form of a service provided by a telecommunications network operator.

A service that is available from telecommunications operators is also known that enables a caller to deposit a message on a messaging platform managed by the operator.

The major drawback of that second solution lies in the fact that the messaging platform is a centralized point of the architecture of the telecommunications network.

Obviously, this centralization renders the technical solution relatively vulnerable in the face of attacks or malfunctions.

OBJECT AND SUMMARY OF THE INVENTION

The invention is based on a peer to peer architecture telecommunications network and eliminates the above-mentioned drawbacks.

In such an architecture, each uniquely identified terminal forms a peer of the network, each terminal being able to operate both as a server and as a client.

More precisely, a first aspect of the invention is directed to a method of use in a peer to peer network for the deposition by a depositor of a message intended for an addressee, the method comprising the following steps:
 storing the message in at least one depositary peer;
 the depositary peer sending a message notifying the storage of the message to at least one superpeer of the peer of said depositor;
 the superpeer of the peer of the depositor sending a notice of reception of the message to a peer of the addressee, the notice indicating that the depositary peer that has stored the message.

In one implementation, a plurality of portions of the message are stored in a plurality of depositary peers. The plurality of depositary peers send respective messages notifying storage of the portions that they have stored to the superpeer of the peer of the depositor. The superpeer of the depositor sends a notice of reception of the message to a peer of the addressee, that notice including a list of the depositary peers and the respective identifiers of the portions of the message stored by the depositary peers.

In one implementation of the invention, all the portions of the same message have the same identifier.

Thus the invention exploits the capacity of the storage spaces of the peers of the network, which in practice is unlimited, thereby eliminating infrastructure (maintenance, computation, storage) costs for the operator. In the particular circumstance where the peers consist of computers, the messages or message portions are in practice stored on the hard disks of those computers.

The invention also has the advantage of not requiring a dedicated answering machine to be acquired, the peers consisting in practice of personal computers connected to the network for other reasons (for Internet access in particular).

It can be observed at this point that, in contrast to the known information sharing systems used in peer to peer networks (KAZAA in particular), the message deposition method of the invention includes a step of the depositary peer sending a notification message to a superpeer of the peer of the depositor.

It can also be observed that this is not a question of sharing messages in the strict sense, since a message deposited by a depositor is intended for a particular addressee.

In accordance with the invention, the message can be stored in its entirety in one or more depositary peers.

It can also be stored in portions in a plurality of depositary peers.

The person skilled in the art will readily understand that this fragmentation makes it possible in particular to increase the speed of downloading messages.

A message can also be stored in its entirety in one depositary peer and in portions in a plurality of depositary peers.

The fact of being able to store a message in a plurality of depositary peers has the advantage of ensuring continuity of service even if one of the depositary peers is inactive.

In one implementation, the peer of the depositor is a depositary peer for the whole of the message.

This implementation advantageously enables the message to be stored even if the peer of the depositor is temporarily disconnected from the peer to peer network.

One implementation of the deposition method of the invention includes, before the sending step, a step of detecting the peer of the addressee.

The person skilled in the art will understand that this detection step is executed if the peer of the addressee is not connected to the peer to peer network.

This detection step can be executed by the peer of the depositor or by at least one of its superpeers.

In one implementation, the peer of the depositor or at least one superpeer of the peer of the depositor elects at least one of the depositary peers.

Accordingly, in this implementation, the elected depositary peers function by replication of the peer of the depositor. In the context of the invention, "replication" refers to additional copying of the message in its entirety or in one or more portions.

Thus, in concrete terms, some depositary peers can host only message portions.

One implementation of the deposition method includes a preliminary step of invitation to deposit a message, that invitation being sequenced by a superpeer of the peer of the depositor. This implementation is particularly advantageous if some peers of the network (for example dedicated videophone terminals) do not have sufficient processing capacity to host the message sequencing logic.

Alternatively, the invitation to deposit a message is sequenced by the peer of the depositor.

Of course, the person skilled in the art will understand that this invitation step is executed if the peer of the addressee is busy or more generally inaccessible.

In one implementation, the superpeer of the peer of the depositor sends a message indicating reception of a message to a terminal of the addressee that is not connected to the peer to peer network.

In particular, the terminal may be a mobile telephone and the confirmation message consist of an SMS text message.

Accordingly, an addressee of a message may be informed of the reception of a message even if not in the vicinity of the corresponding peer.

One implementation of the method includes a step of eliminating messages or message portions stored by the depositary peers after a predetermined time period.

This prevents overloading the memory of the depositary peers with old messages.

An embodiment of the invention is directed to a method of obtaining a message stored for the benefit of an addressee in a peer to peer network.

This method comprises the following steps:
a peer the of addressee receiving a notice of reception of the message from at least one superpeer of a peer of the depositor of the message, the notice indicating at least one depositary peer that has stored the message;
the peer of the addressee obtaining the message from the depositary peer; and
the peer of the addressee delivering the message.

In one implementation, the aforementioned notice includes a list of a plurality of depositary peers that have stored all or portions of the message and respective identifiers of those message portions. The step of obtaining the message then consists in obtaining the message in its entirety or in portions from these depositary peers.

In one implementation, the method of the invention of obtaining messages includes a step of the peer of the addressee sending an acknowledgement of reception of the aforementioned notice to at least one superpeer of the peer of the depositor.

Another embodiment of the invention is directed to:
an information medium readable by an electronic data processing system, the medium possibly being totally or partially removable, in particular a CD ROM or magnetic medium, such as a hard disk or a diskette, or being a transmissible medium, such as an electrical or optical signal, and including instructions of a computer program for implementing the above method of obtaining a message; and
a computer program stored on an information medium, said program including instructions for executing the above method of obtaining a message when that program is loaded into and executed by an electronic data processing system.

Accordingly, on reception of the aforementioned notice of reception, the peer of the addressee can reconstitute the message sent by the depositor from the various message portions obtained from the depositary peers.

Of course, if the message is stored in its entirety in a depositary peer, the peer of the addressee can read the message directly from that depositary peer. The message can also be stored in the peer of the addressee at the same time as reading it.

The peer of the addressee advantageously acknowledges reception of the notice of reception so that the superpeers of the peer of the depositor do not need to forward that notice.

Thus in accordance with an embodiment of the invention, to obtain a message from the depositary peers, it is essential to know the identifier of the message or the identifiers of the message portions. This ensures that the message cannot be read by a malicious peer.

In one implementation, obtaining a message employs the Hording principle. This principle is known in the art and is not described here. For further information, the person skilled in the art may refer to the following document in particular: "Incentives Build Robustness in Bit Torrent" by Bram Cohem, May 22 2003.

Another embodiment of the invention is directed to a messaging system for use in a peer to peer network, the system comprising:
at least one depositary peer for storing a message intended for an addressee;
at least one superpeer of the peer of the depositor of that message; and
a peer of an addressee of the message.

The depositary peer is adapted to send a message notifying storage of the message to the superpeer of the peer of the depositor. The superpeer of the peer of the depositor is adapted to send a notice of reception of the message to the peer of the addressee of that message, that notice indicating the depositary peer that has stored the message.

One embodiment of the messaging system of the invention includes a plurality of depositary peers adapted to store a respective plurality of portions of the message intended for the addressee and to send respective messages notifying storage of the stored message portion to the superpeer of the peer of the depositor. The notice of reception of the message sent by the superpeer of the peer of the depositor to a peer of the addressee of that message includes a list of the depositary peers that have stored message portions and respective identifiers of the portions of the message stored by the depositary peers.

In one embodiment of the messaging system of the invention, the superpeer of the peer of the depositor is adapted to send a message confirming storage of the message to a terminal of said addressee that is not connected to the peer to peer network.

Since the particular advantages of the method of obtaining messages, the information medium, the computer program, and the messaging system are identical to those of the deposition method mentioned above, they are not repeated here.

BRIEF DESCRIPTION OF THE DRAWINGS

Other aspects and advantages of the present invention become more clearly apparent on reading the following description of particular embodiments given by way of non-limiting example only and with reference to the appended drawings, in which.

DETAILED DESCRIPTION OF THE DRAWINGS

Figure 1:
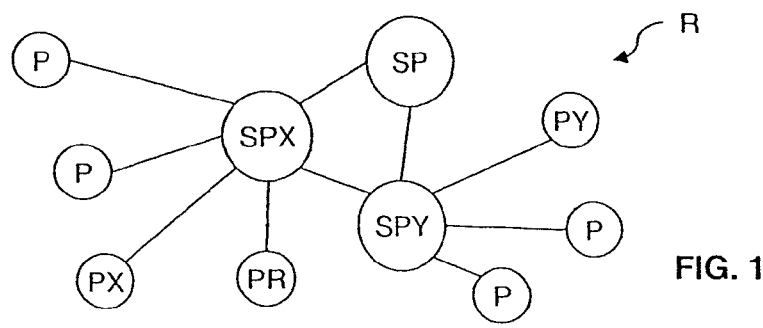
FIG. 1 represents a telecommunications network and one embodiment of a messaging system in accordance with the invention.

FIG. 1 represents a telecommunications network R for implementing a messaging service in accordance with the present invention.

This telecommunications network is a hybrid peer to peer network.

As is known in the art, the hybrid topology reduces the size of the peer to peer network at the same time as minimizing information searches and traffic within the network.

A hybrid topology network uses superpeers SP that consist of peers P selected for their computation power and their bandwidth, for example, these superpeers being in particular responsible for certain functions within the network such as indexing information and having an intermediary role in the transportation of requests.

As is known in the art, the superpeers communicate with each other in a decentralized manner using search requests that are concealed from the peers.

The peers of the network communicate in a centralized manner.

In such a network, each peer has the potential to become a superpeer, whilst retaining the functions appropriate to the operation of a conventional peer.

The process of connection to the peer to peer network being known to the person skilled in the art, it is not described here.

For more information, the person skilled in the art may refer to widely available Internet web sites maintained by organizations providing descriptions of peer to peer networks, such as gnutella.

In the remainder of the description, it is therefore assumed that the connections of the peers with their superpeers have been established and that the peers are therefore connected to the messaging community to deposit or listen to messages.

The following notation is used below:

P, a peer;
PX, the peer of the depositor X;
PY, the peer of the addressee Y;
SPX, the superpeer of the peer PX of the depositor X;
SPY, the superpeer of the peer PY of the addressee Y; and
PR, a replication peer elected by the superpeer SPX of the peer PX of the depositor X.

Figure 2:
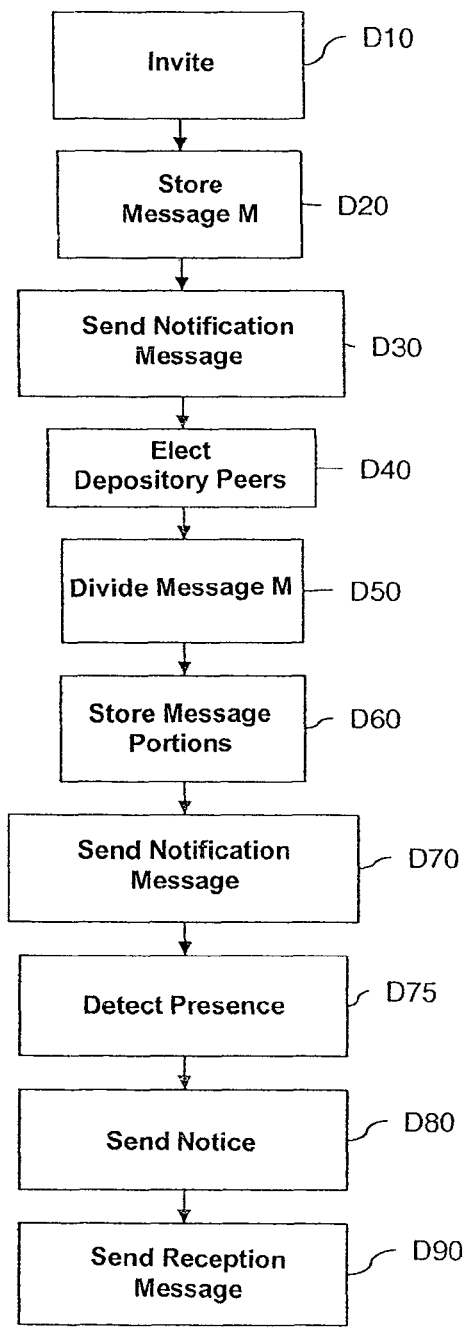
FIG. 2 represents the principal steps of one implementation of a deposition method in accordance with the invention.
Figure 4:
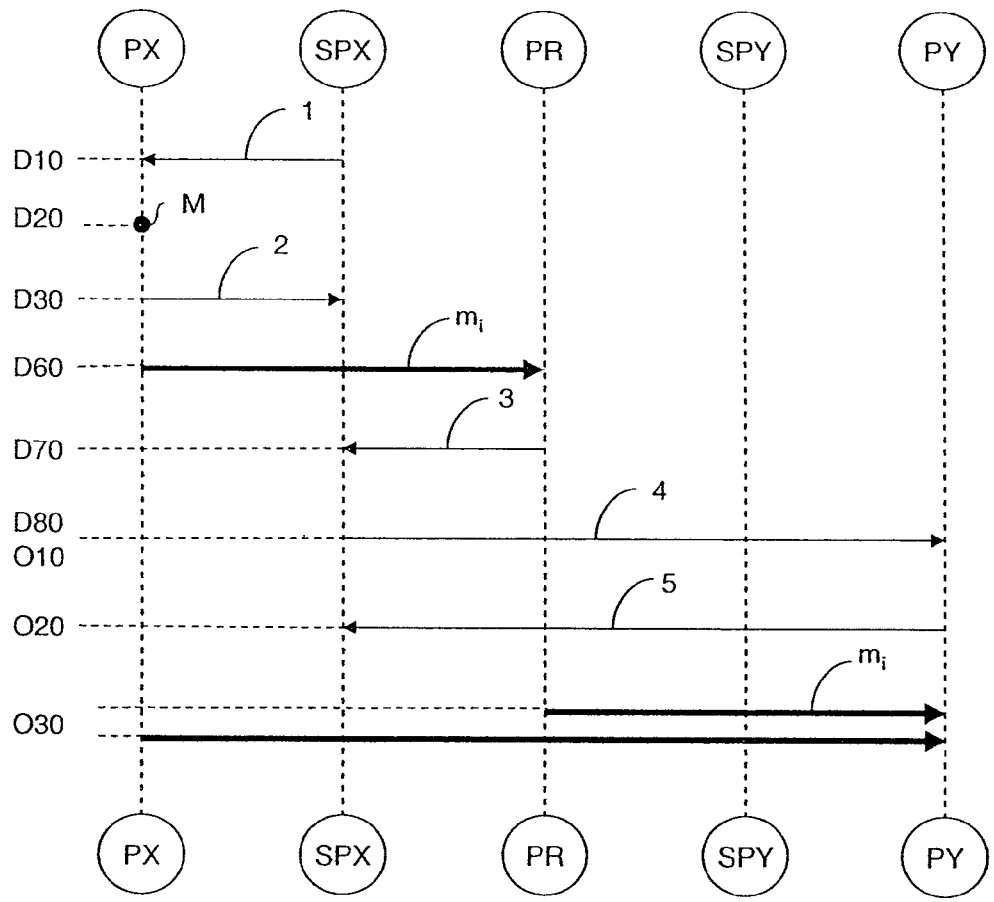
FIG. 4 represents the principal steps of one implementation of a method in accordance with the invention for obtaining messages.

One implementation of a method in accordance with the invention for depositing a message is described below with reference to FIGS. 2 and 4.

Here the context is that of a depositor X using a peer PX and requiring to deposit a message for an addressee Y using a peer PY.

This message deposition facility may in particular be used when the depositor X wishing to communicate with the addressee Y receives information to the effect that the peer PY of the addressee Y is busy or more generally inaccessible (in response to receiving the busy tone, for example).

Under such circumstances, the peer PX of the depositor X notifies its superpeer SPX that it wishes to deposit a message for the addressee Y in order for that superpeer to sequence the message deposition process. Of course, this notification is not necessary if the invitation to deposit the message is sequenced by the peer PX itself.

Under such circumstances, during a preliminary step D10, the superpeer SPX of the peer PX of the depositor X sequences a message 1 inviting deposition of a message M, the recorded message itself being integrated into the software of the peer PX of the depositor X.

This sequencing, which is known in itself to the person skilled in the art, in particular enables the depositor X to listen to a message, confirm it, delete it, add to it, or start again.

This preliminary invitation step D10 is followed by a step D20 in which the depositor X stores the message M in its entirety in the corresponding peer PX.

This local storage step D20 is followed by a step D30 in which the peer PX of the depositor X sends its superpeer SPX a message 2 notifying completion of storage of the message M.

In the embodiment described here, during a step D40, the superpeer SPX elects other depositary peers PR used as replicas of the peer PX of the depositor X to store the message M.

This election step D40 being known to the person skilled in the art, it is not described here.

In the embodiment described here, this election step D40 is followed by a step D50 of the peer PX of the depositor X dividing the message M into message portions mi. This division step D50 is optional, of course, and is not imposed if the message is of small size. The person skilled in the art will understand that the division step D50 can also be effected in parallel with the election step D40.

This division step D50 is followed by a step D60 in which the peer PX of the depositor X stores one or more portions mi of the message M (or the whole of the message M) in the depositary peers PR elected in the step D40. This storage process is controlled by the superpeer SPX of the peer PX of the depositor X.

This storage step D60 is followed by a step D70 in which each of the depositary peers PR elected during the election step D40 that have stored at least one portion mi of the message M sends a notification message 3 to the superpeer SPX of the peer PX of the depositor X.

On receipt of these notification messages 3, during a step D80, the superpeer SPX of the peer PX of the depositor X sends to the peer PY of the addressee Y a notice of reception 4 that includes a list of the depositary peers PX, PR and an identifier of each of the portions mi of the message M stored by each of the depositary peers (remember that all these portions mi can have the same identifier).

If no peer PY of the addressee Y is connected to the peer to peer network, this sending step D80 is preceded by a step D75 of detecting the presence of a peer PY of the addressee Y on the peer to peer network. This detection step D75, which is known in the art, can be executed by one of the superpeers SPX of the peer PX of the depositor X, for example.

This detection step D75 is followed by the sending step D80 described above.

In the implementation described here, and as described above with reference to the step D20, the notice of reception 4 includes in particular the identifier of the peer PX of the depositor X that contains the whole of the message M.

In the implementation described here, the step D80 of sending the notice 4 is followed by a step D90 in which the superpeer SPX of the peer PX of the depositor X sends a message indicating reception of the message M to a terminal T of the addressee Y that is not connected to the peer to peer network.

This notification step D90 can in particular be executed using the SMS protocol to send a message notifying reception to a mobile telephone of the addressee Y.

To this end, a centralized communication model may be envisaged, the operator preferably having control of this function.

Figure 3:
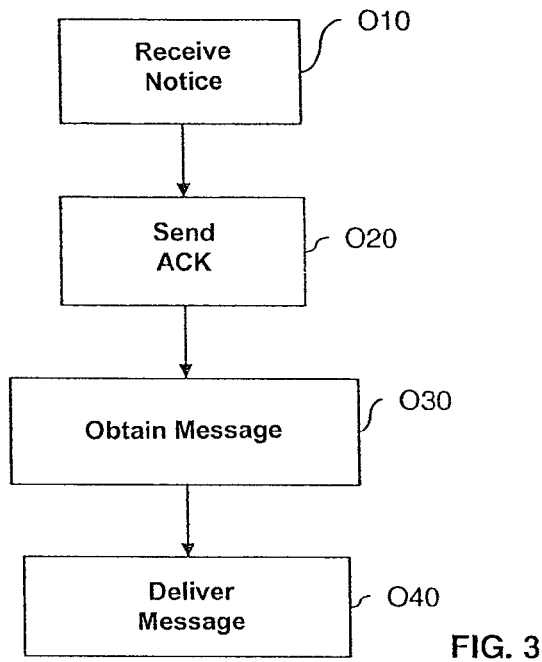
FIG. 3 represents the exchange of control data within the FIG. 1 network.

A method of obtaining the message M stored on the peer to peer network for the benefit of the addressee Y is described next with reference to FIGS. 3 and 4.

As described above, during a step O10 that is symmetrical to the sending step D80, the peer PY of the addressee Y receives from the superpeer SPX of the peer PX of the depositor X the notice 4 of reception of the message M.

As described above, that notice 4 includes a list of the depositary peers PX, PR of the whole of the message M or of a portion of the message and an identifier of the message M or of each of the portions of that message stored by each of the depositary peers.

In the embodiment described with reference to FIGS. 2 and 4, the peer PX of the depositor X is one of the depositary peers for the whole of the message M.

Following the step O10 of reception of the notice 4, the method of obtaining a message includes a step O20 of the peer PY sending the addressee Y an acknowledgement 5 of reception of that notice 4, this acknowledgement being sent to the superpeer SPX of the peer PX of the depositor X.

This step O20 of sending an acknowledgement avoids the superpeer SPX of the peer PX of the depositor X forwarding the notice 4 to the peer PY of the depositor Y.

This step O20 of sending the acknowledgement 5 is followed by a step O30 in which the peer PY obtains the message M from the depositaries PX, PR, in its entirety or in portions mi.

In the embodiment described here, the message is obtained by means of the Hording principle.

The message M is then delivered to the addressee Y by the corresponding peer PY during a delivery step O40.

In the embodiment described here, once the message has been delivered, the peer PY of the addressee sends an end of message notice to the superpeer SPX of the peer PX of the depositor X.

That superpeer PX then instructs the deletion of the message by the depositor PX and broadcasts a message to all of the depositary peers PR requesting them to delete the portions mi of the message M.

In any event, in the implementation described here, each depositary peer PX, PR is adapted to eliminate the message M or any portion mi of the message M after a predetermined time to live TTL.

The invention claimed is:

1. A deposition method of use in a peer to peer network, the method comprising:
    storing at least a portion of a message intended by a depositor for an addressee in a depositary peer;
    sending with the depositary peer a notice of storage to at least one superpeer of a peer of the depositor; and
    sending with the at least one superpeer a notice of reception of the message to a peer of the addressee, the notice of reception indicating the depositary peer;
    storing a plurality of portions of the message in respective peers of a plurality of depositary peers;
    sending with the depositary peer a plurality of notices of storage of the plurality of portions of the message to the at least one superpeer; and
    obtaining with the peer of the addressee at least the portion of the message from the depositary peer;
    wherein the notice of reception includes a list of depositary peers and respective identifiers of each of the plurality of portions of the message stored by the depositary peers of the list.

2. The deposition method according to claim 1, wherein the method includes a preliminary step of inviting to deposit said message, said inviting being sequenced by one of the depositor and the at least one superpeer.

3. The deposition method according to claim 1, wherein the method includes sending, by the at least one superpeer, a notice indicating reception of a message to a terminal of said addressee that is not a peer of the peer to peer network.

4. The deposition method according to claim 1, wherein the method includes deleting a portion of the plurality of portions of the message in the depository peer after a predetermined time period.

5. A method of obtaining a message stored in a peer to peer network, the method comprising:
    receiving with a peer of an addressee of a message a notice of reception of the message from at least one superpeer of a peer of a depositor of the message, said notice of reception indicating at least one depository peer that has stored at least a portion of the message;
    obtaining with the peer of the addressee at least a portion of the message from the at least one depository peer; and
    delivering the message to the addressee with the peer of the addressee;
    wherein said notice of reception includes a list of a plurality of depository peers, each depository peer of the list having stored at least a portion of the message and the notice of reception further includes respective identifiers of portions of the message stored in the plurality of depository peers; and
    wherein obtaining the message comprises obtaining the message in its entirety or in portions of the message from the plurality of depository peers.

6. The method according to claim 5, further comprising:
    sending, by the peer of the addressee, an acknowledgement of reception of the notice of reception to the at least one superpeer of the peer of the depositor.

7. A messaging system for use in a peer to peer network, the system comprising:
    at least one depository peer configured to store at least a portion of a message intended for an addressee;
    at least one superpeer of a peer of a depositor of said message; and
    a peer of an addressee of the message;
    the at least one depository peer being further configured to send at least one notice of storage of at least a portion of the message to the at least one superpeer and the at least one superpeer being configured to send a notice of reception of the message to the peer of the addressee, said notice of reception indicating the at least one depository peer that has stored the at least one portion of the message,
    provide to the peer of the addressee of the message at least the portion of the message; and
    store at least a portion of the message and configured to send a notice of storage of the stored portions of the message to the at least one superpeer, the notice of reception of the message further including a list of depository peers that have stored at least a portion of the message and respective identifiers of the respective portions of the message stored by the depository peers of the list;
    wherein the message is provided in its entirety or in portions of the message from the depository peers of the list.

8. The messaging system according to claim 7, wherein the at least one superpeer is configured to send a notice of storage of said message to a terminal of said addressee that is not a peer of the peer to peer network.

9. A non-transitory information medium encoded with a computer program executed by an electronic data processing system that causes a stored message to be obtained in a peer to peer network, the computer program comprising:
    program code for receiving with a peer of an addressee of a message a notice of reception of the message from at least one superpeer of a peer of a depositor of the message, said notice of reception indicating at least one depository peer that has stored at least a portion of the message;

program code for obtaining with the peer of the addressee at least a portion of the message from the at least one depository peer; and program code for delivering the message to the addressee with the peer of the addressee the message;

wherein said notice of reception includes a list of a plurality of depository peers, each depository peer of the list having stored at least a portion of the message and the notice of reception further includes respective identifiers of portions of the message stored in the plurality of depository peers; and wherein obtaining the message comprises obtaining the message in its entirety or in portions of the message from the plurality of depository peers.

10. A superpeer for use in a peer to peer network, the superpeer being configured to:

receive at least one notification of storage of at least one portion of a message from a depository peer of the peer to peer network;

send a notice of reception of the message to a peer of an addressee of that message, said notice of reception indicating the depository peer that has stored at least a portion of the message;

obtain with the peer of the addressee at least the portion of the message from the depository peer; and receive a plurality of notifications, each notification being a notification of the storage of at least the portion of the message and to insert into the notice of reception a list of depository peers that have stored at least the portion of the message and respective identifiers of the respective portions of the message stored by the depository peers of the list;

wherein the message is obtained in its entirety or in portions of the message from the plurality of depository peers.

* * * * *